US012743686B2

(12) United States Patent
Guindon et al.

(10) Patent No.: US 12,743,686 B2
(45) Date of Patent: Sep. 22, 2026

(54) POINT OF SALE DEVICES

(71) Applicant: JPMORGAN CHASE BANK, N.A., New York, NY (US)

(72) Inventors: Patrick Guindon, New York, NY (US); John Frerichs, New York, NY (US); Inna Lobel, New York, NY (US); Francois D Nguyen, Brooklyn, NY (US); Jung Soo Park, Brooklyn, NY (US); Kebei Li, Ridgewood, NY (US); Adam Christopher Wrigley, Brooklyn, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 668 days.

(21) Appl. No.: 18/047,616

(22) Filed: Oct. 18, 2022

(65) Prior Publication Data

US 2023/0120610 A1 Apr. 20, 2023

Related U.S. Application Data

(60) Provisional application No. 63/257,519, filed on Oct. 19, 2021.

(51) Int. Cl.
*G06Q 20/20* (2012.01)

(52) U.S. Cl.
CPC ......... *G06Q 20/204* (2013.01); *G06Q 20/208* (2013.01); *G06Q 20/209* (2013.01)

(58) Field of Classification Search
CPC .... G06Q 20/20; G06Q 20/204; G06Q 20/208; G06Q 20/209; G06Q 20/32; G06Q 20/34; G06Q 20/3278; G07G 1/00; G07G 1/0036; G07G 1/0045
See application file for complete search history.

(56) References Cited

U.S. PATENT DOCUMENTS

| | | | | |
|---|---|---|---|---|
| 9,092,766 | B1 * | 7/2015 | Bedier | G07G 1/0018 |
| 10,740,741 | B2 * | 8/2020 | Spice | G06Q 20/3278 |
| 11,836,566 | B2 * | 12/2023 | Chen | G06Q 20/202 |
| 2012/0257340 | A1 * | 10/2012 | Kim | H04B 1/3888 361/679.01 |
| 2018/0075709 | A1 * | 3/2018 | Watanabe | G07G 1/12 |

(Continued)

FOREIGN PATENT DOCUMENTS

WO WO-2021152461 A1 * 8/2021 ............. G06F 21/87

*Primary Examiner* — Laura A Gudorf
(74) *Attorney, Agent, or Firm* — GREENBERG TRAURIG LLP

(57) ABSTRACT

Point of sale devices are disclosed. A register point-of-sale system may include: a register base; a customer screen that is removeable received by the register base; a merchant screen adjustably mounted on the register base; and a card reader integrated into the customer screen. A mobile payment terminal system may include: a mobile payment terminal comprising a wireless card reader, magnetic stripe reader, slot that receives a chip card, a screen, and an integrated receipt printer; and a dock that removably receives the mobile payment terminal. A mobile card reader system may include a cylindrical mobile card reader comprising a screen, a wireless card reader, a magnetic stripe reader, a slot that receives a chip card, and a plurality of base slots that receive a plurality of base latches; and a cylindrical base with an angled end and latches.

16 Claims, 12 Drawing Sheets

(56) References Cited

U.S. PATENT DOCUMENTS

2020/0044403 A1* 2/2020 Allirot ................. G06Q 20/352
2021/0256493 A1* 8/2021 Aburaya ............ G06Q 20/3276
2022/0051216 A1* 2/2022 Sanchez De la Rosa ................... H04L 63/105
2022/0051227 A1* 2/2022 Abdul-Rasul ...... G06Q 20/3278
2022/0284411 A1* 9/2022 Suzuki ................. G07G 1/0072

* cited by examiner

POINT OF SALE DEVICES

RELATED APPLICATIONS

This application claims the benefit of, and priority to, U.S. Provisional Patent Application Ser. No. 63/257,519, filed Oct. 19, 2021, the disclosure of which is hereby incorporated, by reference, in its entirety.

BACKGROUND OF THE INVENTION

1. Field of the Invention

The present disclosure generally relates to point of sale devices.

2. Description of the Related Art

Many point-of-sale devices are unable to be customizable to be used in variable locations and environments for conducting transactions. And mobile point of sale devices tend to be clumsy and easy to misplace.

SUMMARY OF THE INVENTION

Point of sale devices are disclosed. In one embodiment, a register point-of-sale system may include: a register base; a customer screen that is removeable received by the register base; a merchant screen mounted on the register base; and a card reader integrated into the customer screen. The merchant screen is mounted such that it has an adjustable viewing angle.

In one embodiment, the merchant screen comprises an image capture device at a lower portion thereof, wherein the image capture device is positioned to scan an active area below the merchant screen. In one embodiment, the active area may be bounded by the register base.

In one embodiment, the card reader may include one or more of a wireless card reader, a magnetic stripe reader, and a slot that receives a chip card.

According to another embodiment, a mobile payment terminal system may include: a mobile payment terminal comprising a wireless card reader, magnetic stripe reader, slot that receives a chip card, a screen, and an integrated receipt printer; and a dock that removably receives the mobile payment terminal.

In one embodiment, the integrated receipt printer may be a thermal printer.

In one embodiment, the dock may also include a latch that locks the mobile payment terminal to the dock or allows the mobile payment terminal to be removed from the dock.

In one embodiment, the dock charges a battery in the mobile payment terminal when the mobile payment terminal is docked on the dock.

In one embodiment, the dock further also includes a slot for receiving a securing device.

In one embodiment, the mobile payment terminal system may also include a bumper that is removably received by the mobile payment terminal and protects the mobile payment terminal from damage.

According to another embodiment, a cylindrical mobile card reader system may include a cylindrical mobile card reader comprising a screen, a wireless card reader, a magnetic stripe reader, a slot that receives a chip card, and a plurality of base slots that receive a plurality of base latches; and a cylindrical base comprising a first end, a second end, and the plurality of latches on the first end, wherein the first end is angled relative to the second end.

In one embodiment, the screen may include a touch screen.

In one embodiment, the screen is customizable.

In one embodiment, the cylindrical mobile card reader is wearable with a lanyard.

In one embodiment, the cylindrical mobile card reader is removably received by the cylindrical base.

In one embodiment, the cylindrical base charges the cylindrical mobile card reader when the cylindrical mobile card reader is received by the cylindrical base.

In one embodiment, the cylindrical base further comprises a slot for receiving a securing device.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are generally directed to mobile point of sale device. For instance, point of sale devices may be customizable for variations in operating conditions, connectivity, and payment methods.

FIGS. 1-4 depict a register point of sale system, according to aspects of the present disclosure. For instance, the register includes a base member, a merchant display screen, and a customer display screen. It should be noted that these entities are exemplary only; additional, fewer, and/or different elements may be provided as is necessary and/or desired.

In one embodiment, the merchant display screen is attached to the register at a hinge or otherwise variable position device that provides a user configurable position of the merchant display screen. In some embodiments, the customer display screen may be detachable from the register. In this configuration, the customer display screen may include a communication interface that may communicate with the register.

In embodiments, the register point of sale system may include a camera or an optical capture device that may read machine-readable codes, such as QR codes, bar codes, etc. An active area may be provided in which such codes may be read.

Figure 1:
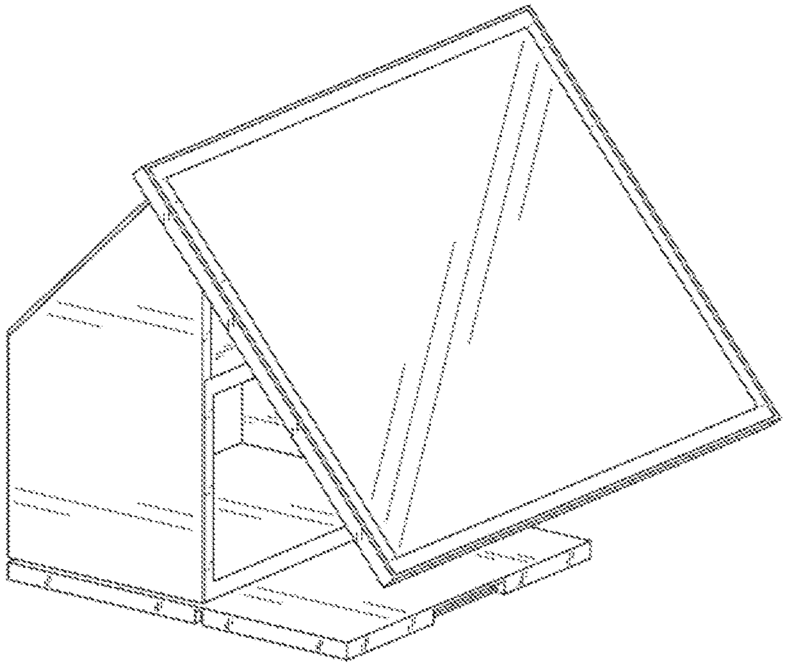
FIGS. 1-4 depict a register point of sale system, according to aspects of the present disclosure.
Figure 2:
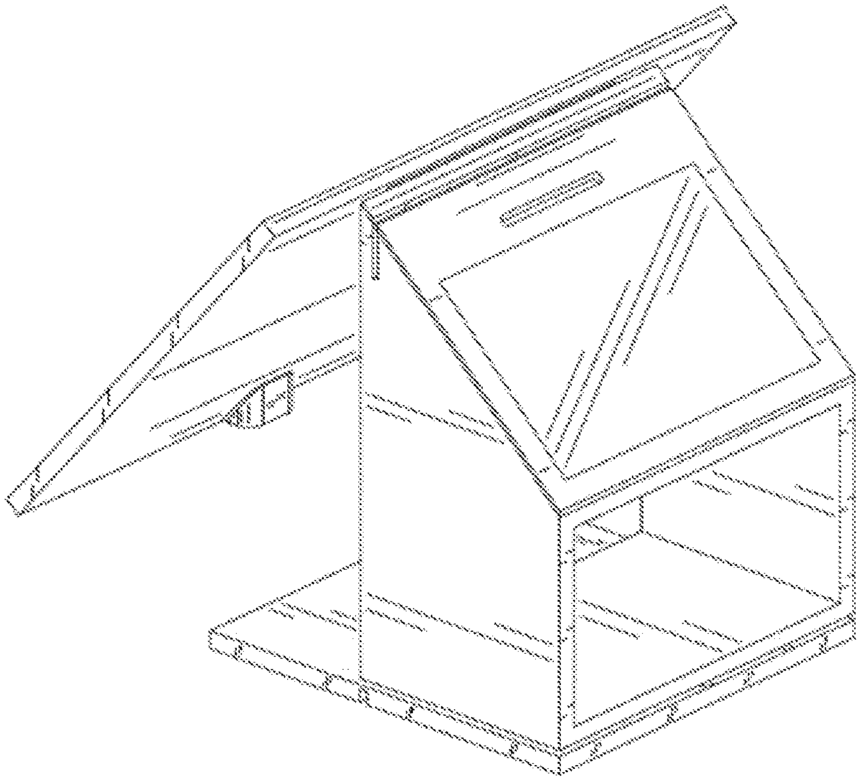
Figure 3:
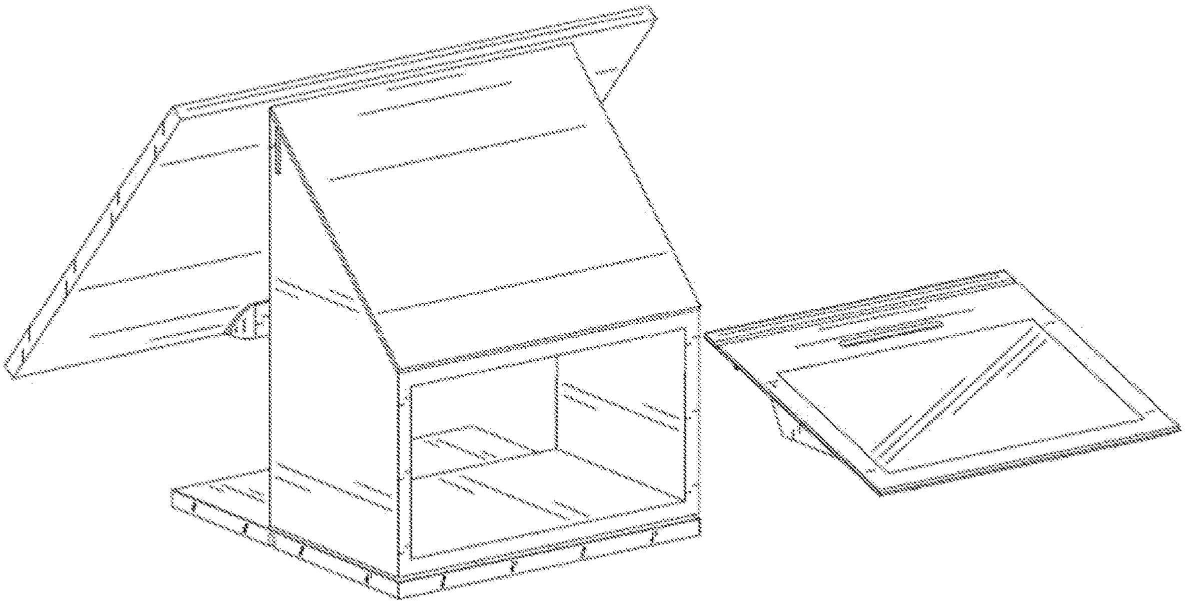
Figure 4:
Figure 5:
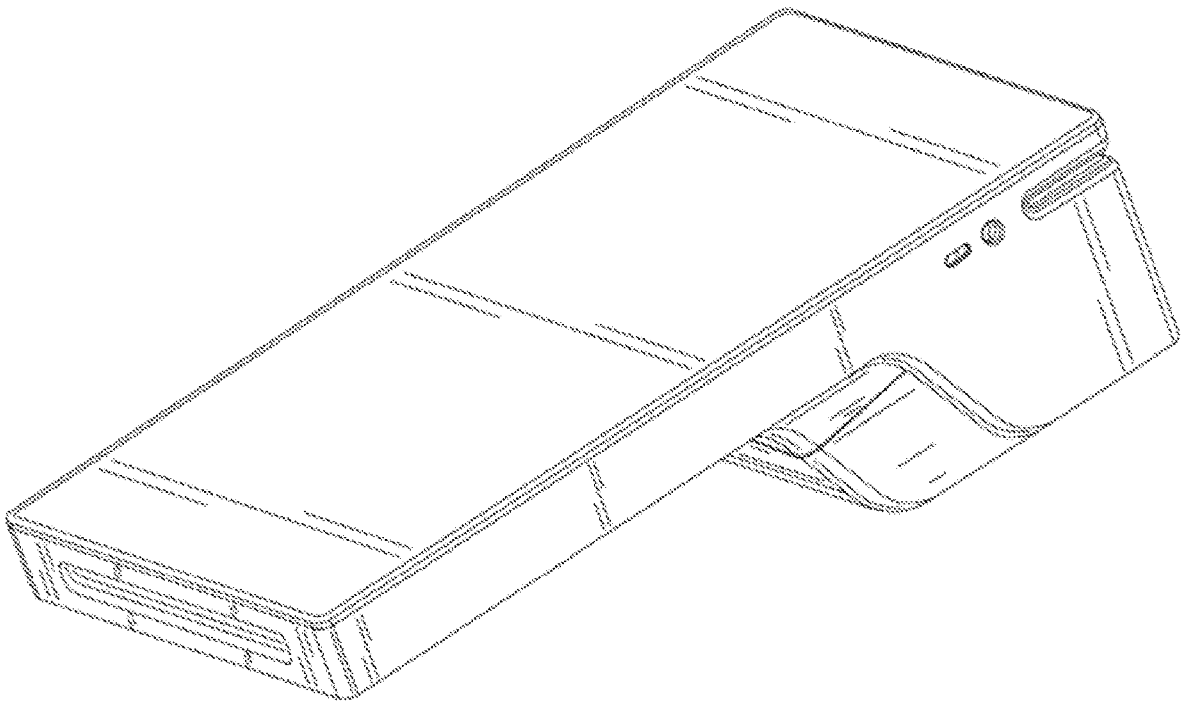
FIG. 5 depicts a mobile payment terminal, according to aspects of the present disclosure.

FIG. 5 depicts a mobile payment terminal, according to aspects of the present disclosure.

Figure 6:
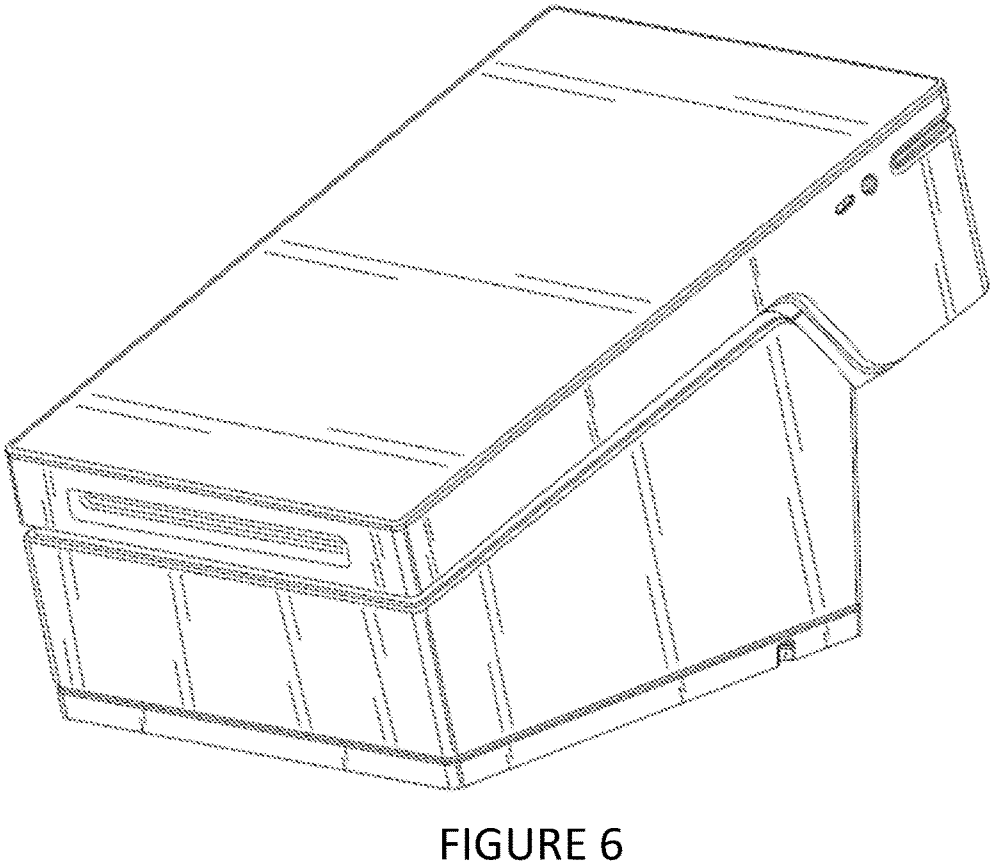
FIG. 6 depicts a mobile payment terminal in a dock, according to aspects of the present disclosure.

FIG. 6 depicts a mobile payment terminal in a dock, according to aspects of the present disclosure. The cradle may include charging and/or connection points that the mobile terminal may use for communication. In other embodiments, the mobile terminal may communicate wirelessly with the mount when in a disconnected or detached mode of operation.

The dock may include a switch (not shown). Setting the dock switch to an unlocked position fully retracts a latching mechanism and enables a quick grab-to-go mobile use case while still charging the mobile payment terminal. Setting the dock switch to the locked position, however, latches the mobile payment device and prevents it from being removed for a stable stationary use case.

While the latches are locked, a Kensington lock or similar may be hooked onto the dock for enhanced security.

The mobile payment device may include a printer that may print receipts. Any suitable printers may be included, including thermal printers.

Figure 7:
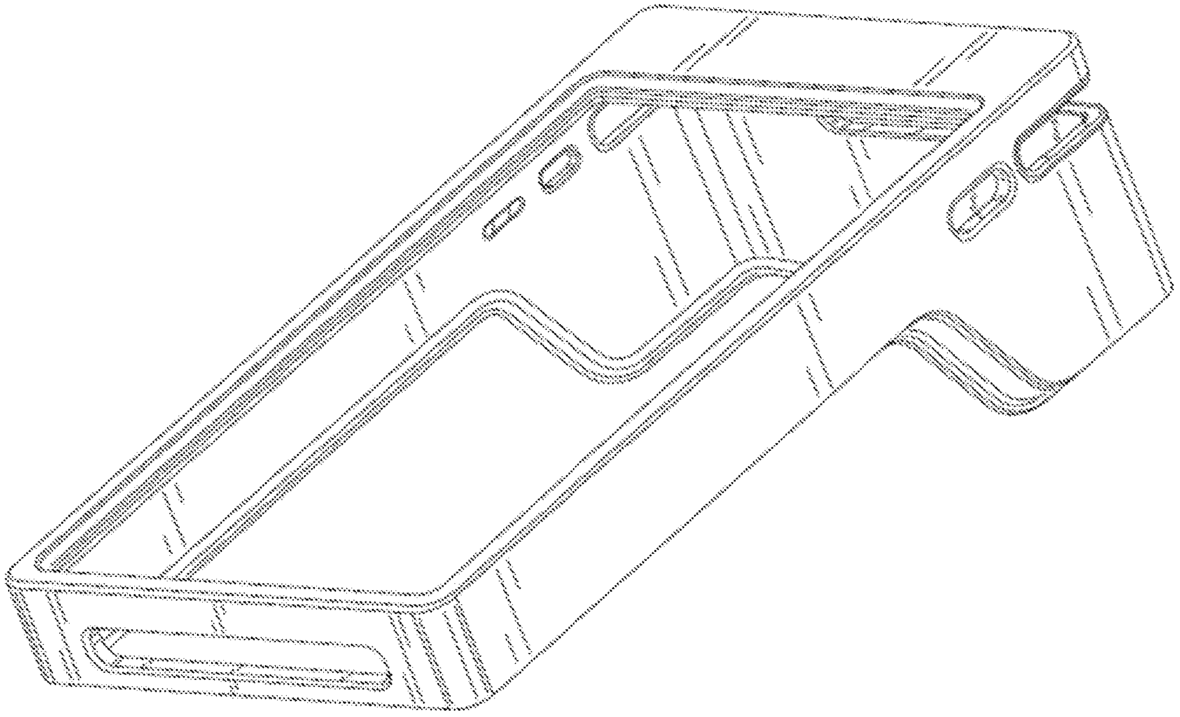
FIG. 7 depicts a bumper for a mobile payment terminal, according to aspects of the present disclosure.

FIG. 7 depicts a bumper for a mobile payment terminal, according to aspects of the present disclosure. The mobile payment terminal may be inserted into the bumper. The bumper may protect the mobile payment terminal from damage, scratches, etc.

Figure 8:
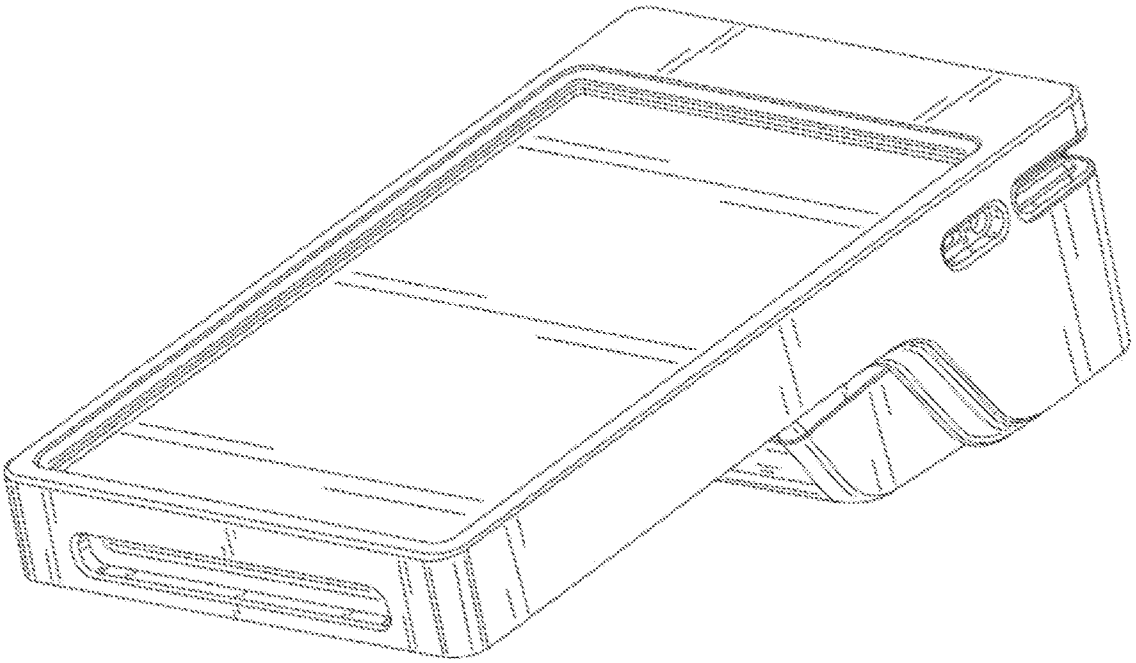
FIG. 8 depicts a mobile payment terminal in a bumper, according to aspects of the present disclosure.

FIG. 8 depicts the mobile payment terminal inserted into the bumper.

Figure 9:
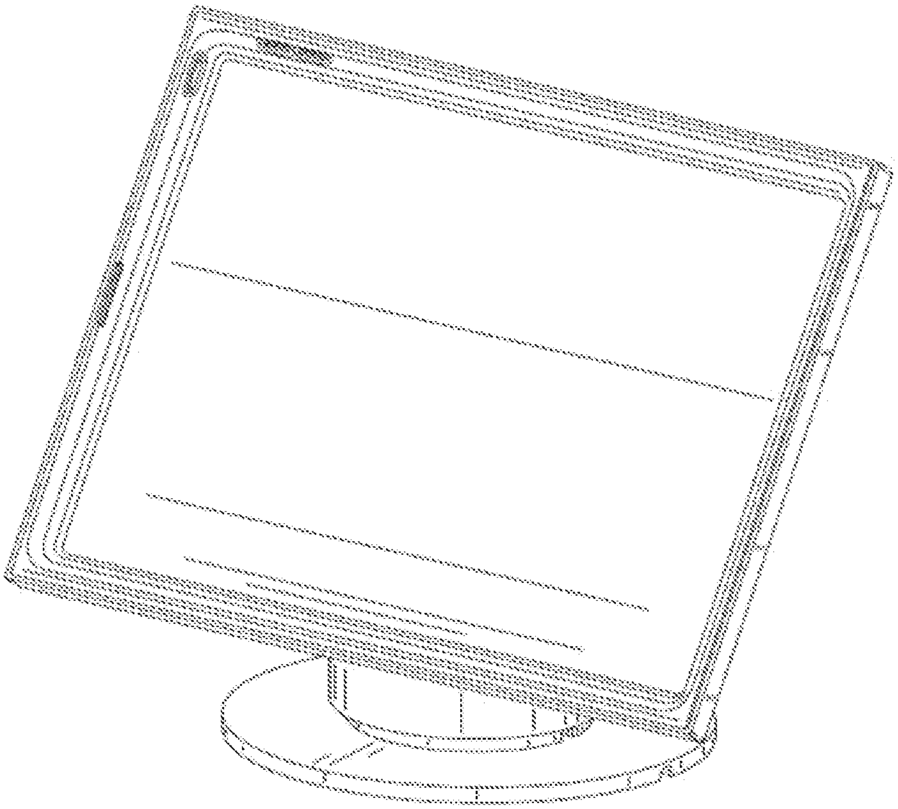
FIG. 9 depicts a perspective of a tablet stand with mount, according to aspects of the present disclosure.
Figure 10:
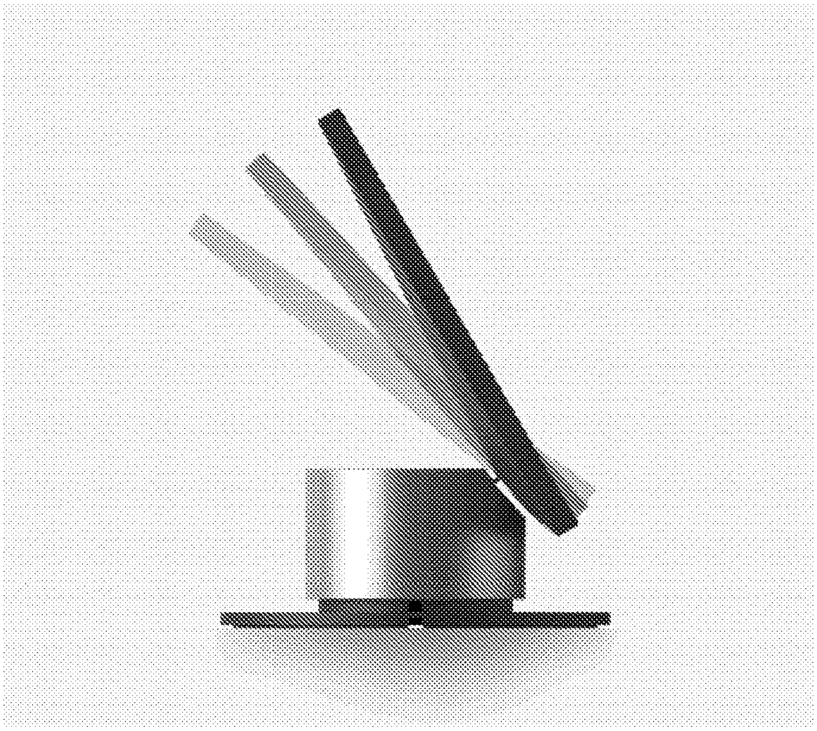
FIGS. 10 and 11 depict articulation of a tablet stand, according to aspects of the present disclosure.
Figure 11:
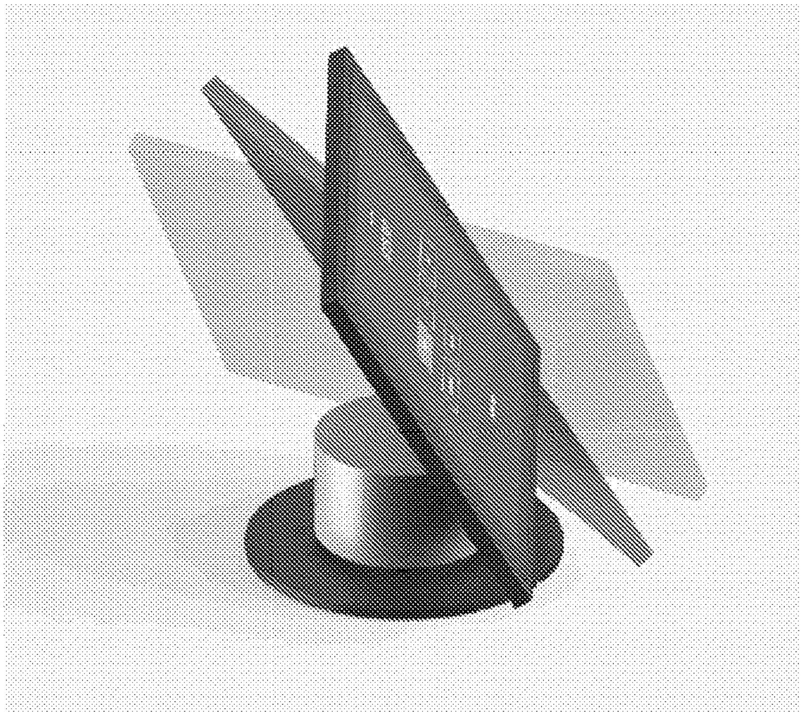

FIG. 9 depicts a depicts a perspective of a tablet stand, according to aspects of the present disclosure. In one embodiment, the tablet stand may have a base member and includes flat panel to which a tablet or similar device may be attached and retained. The tablet stand further provides a user configurable position of the tablet stand. The tablet stand may be authenticated for a specific tablet or may permission a set of tablets as desired. The articulation of the tablet on the tablet stand is depicted in FIGS. 10 and 11.

Figure 12:
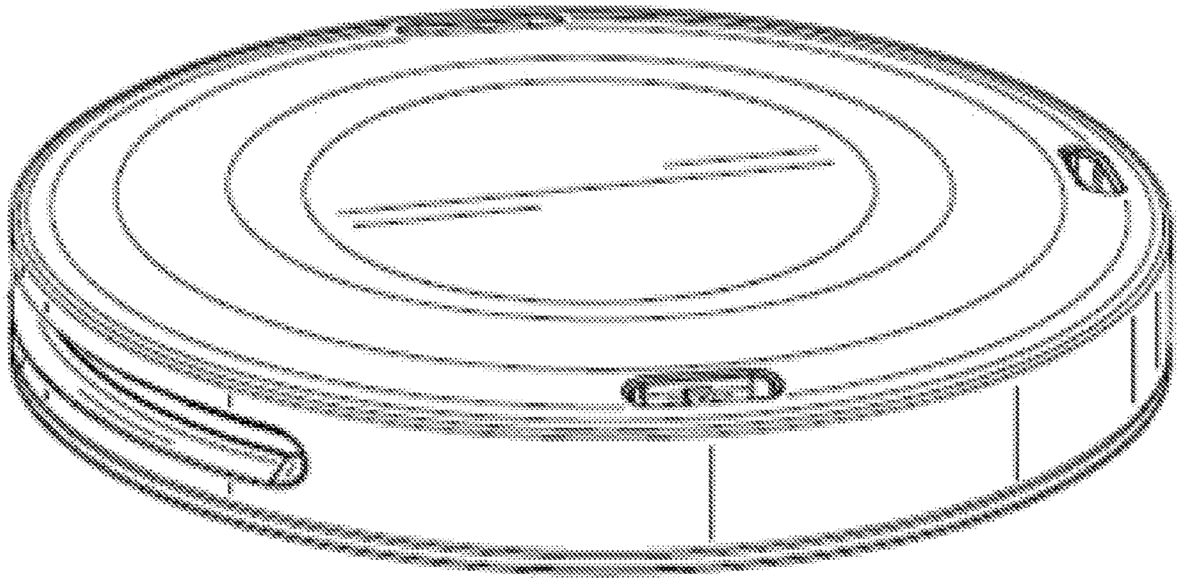
FIG. 12 depicts a perspective view of a card reader, according to aspects of the present disclosure.

FIG. 12 depicts a mobile card reader according to embodiments. The mobile card reader may have a cylindrical shape, and may have connectors, a wireless card reader, and one or more card slots. The mobile card reader may be a stand-alone device, or it may function as a card reader for a point of sale terminal. The wireless card reader may interface with a wireless-enabled transaction card (e.g., credit, debit, stored value, etc.) or mobile electronic device (e.g., smartphone, smart watch, payment token, etc.) using, for example, NFC, Bluetooth, Bluetooth Low Energy (BLE), or any other suitable protocol.

The card slot may receive a transaction card (not shown) and may read a magnetic stripe on the transaction card or may interface with an EMV-enabled chip on the transaction card.

Figure 13:
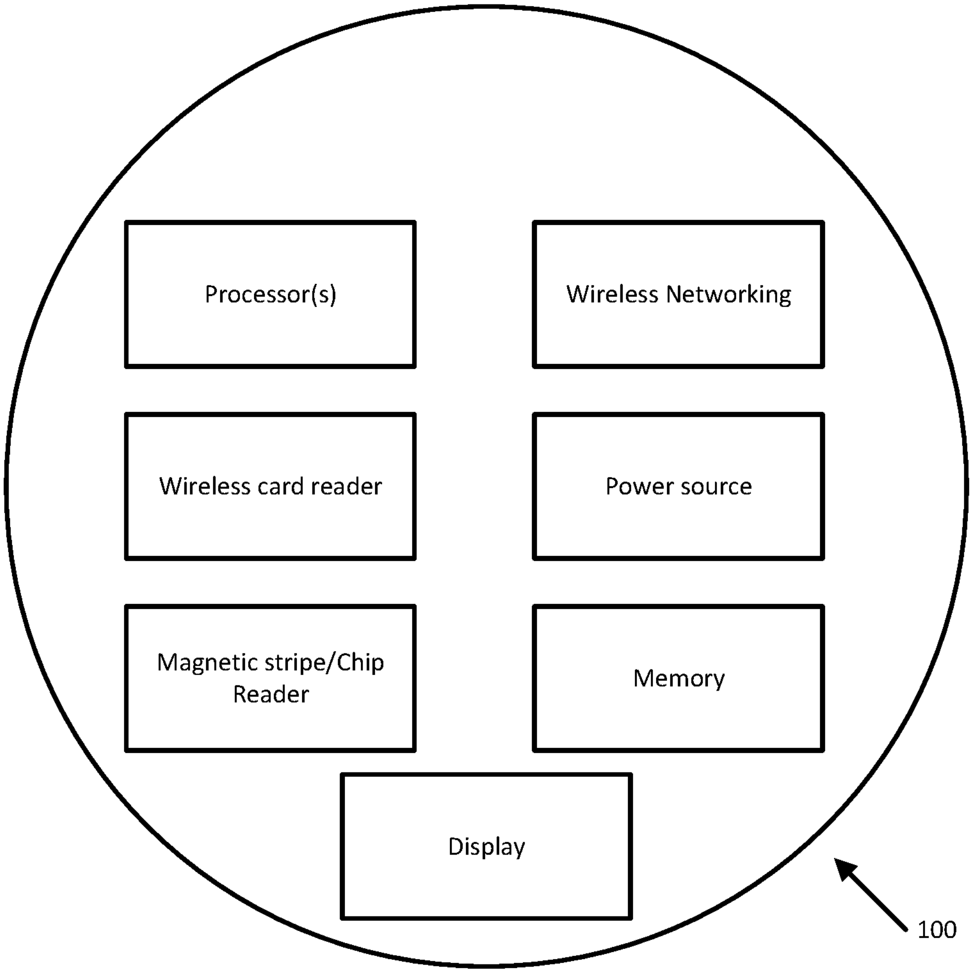
FIG. 13 depicts a block diagram of the card reader of FIG. 11, according to aspects of the present disclosure.

FIG. 13 depicts a block diagram of the mobile card reader of FIG. 12, according to aspects of the present disclosure. The mobile card reader may include one or more computer processors, which may be a general-purpose computer processor or a specialized computer processor. It may further include a magnetic stripe or EMV chip reader, wireless networking, a power source, a memory, and a display.

The wireless networking may provide WiFi, NFC, Bluetooth, etc. connection to another device, such as a point-of-sale terminal, a host, etc.

The power source may include any suitable power source, including rechargeable batteries. In one embodiment, a charging interface (not shown) may facilitate wired charging, wireless charging, etc.

The memory may be a secure memory that may store, for example, payment application, keys, etc.

The display may be any suitable display, including LCD displays.

Figure 14:
FIG. 14 depicts another perspective view of a card reader, according to aspects of the present disclosure.

FIG. 14 depicts another perspective view of the mobile card reader, according to aspects of the present disclosure.

Figure 15:
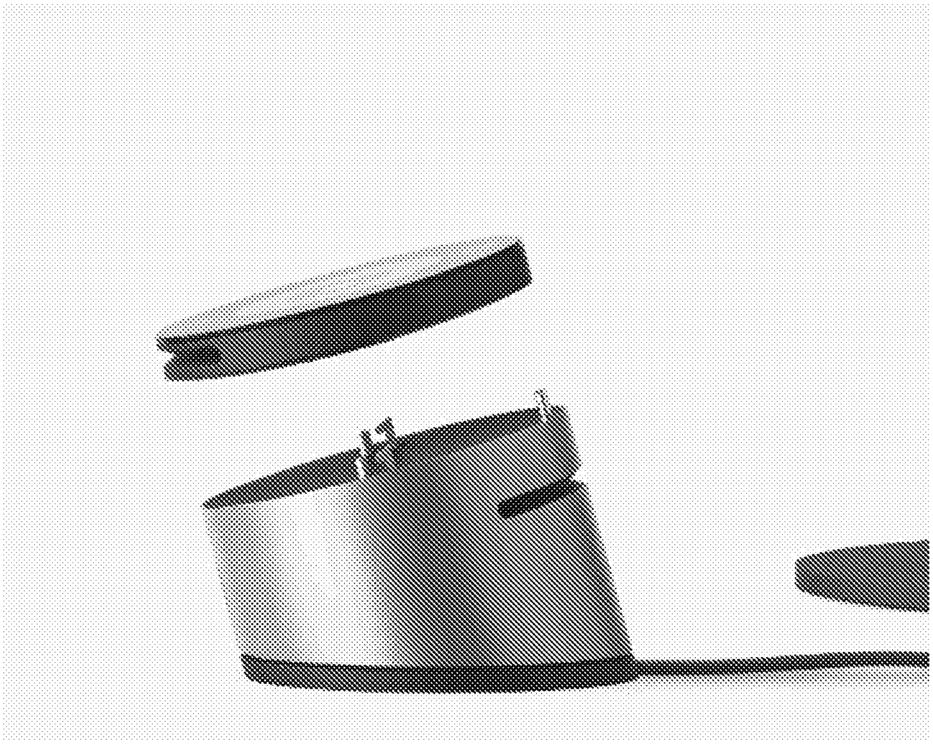
FIGS. 15 and 16 depict views of the card reader and a mounting block, according to aspects of the present disclosure.
Figure 16:
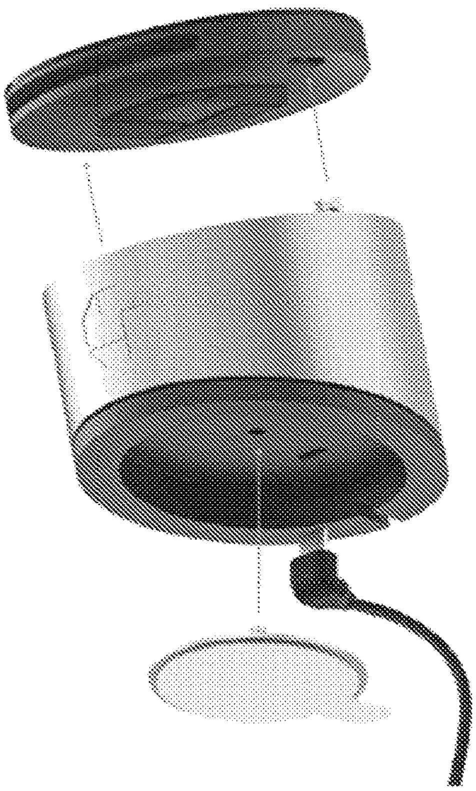

FIGS. 15 and 16 depict views of the mobile card reader and a mounting block, according to aspects of the present disclosure.

Figure 17:
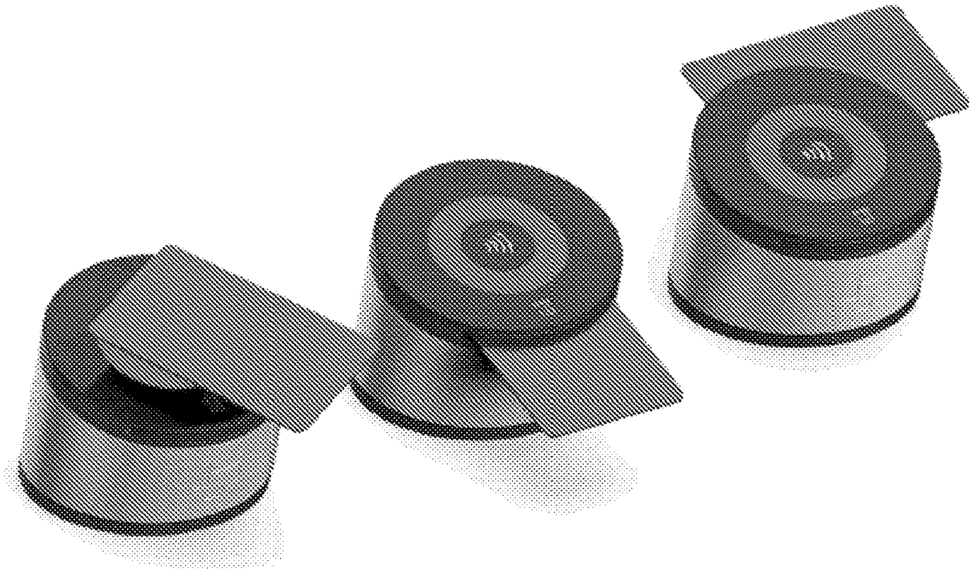
FIG. 17 depicts different methods for transferring card data to a card reader, according to aspects of the present disclosure.

FIG. 17 depicts different methods for transferring card data to a card reader, according to aspects of the present disclosure.

Figure 18:
FIG. 18 depicts a card reader with a lanyard, according to aspects of the present disclosure.

FIG. 18 depicts a mobile card reader with a lanyard, according to aspects of the present disclosure.

Figure 19:
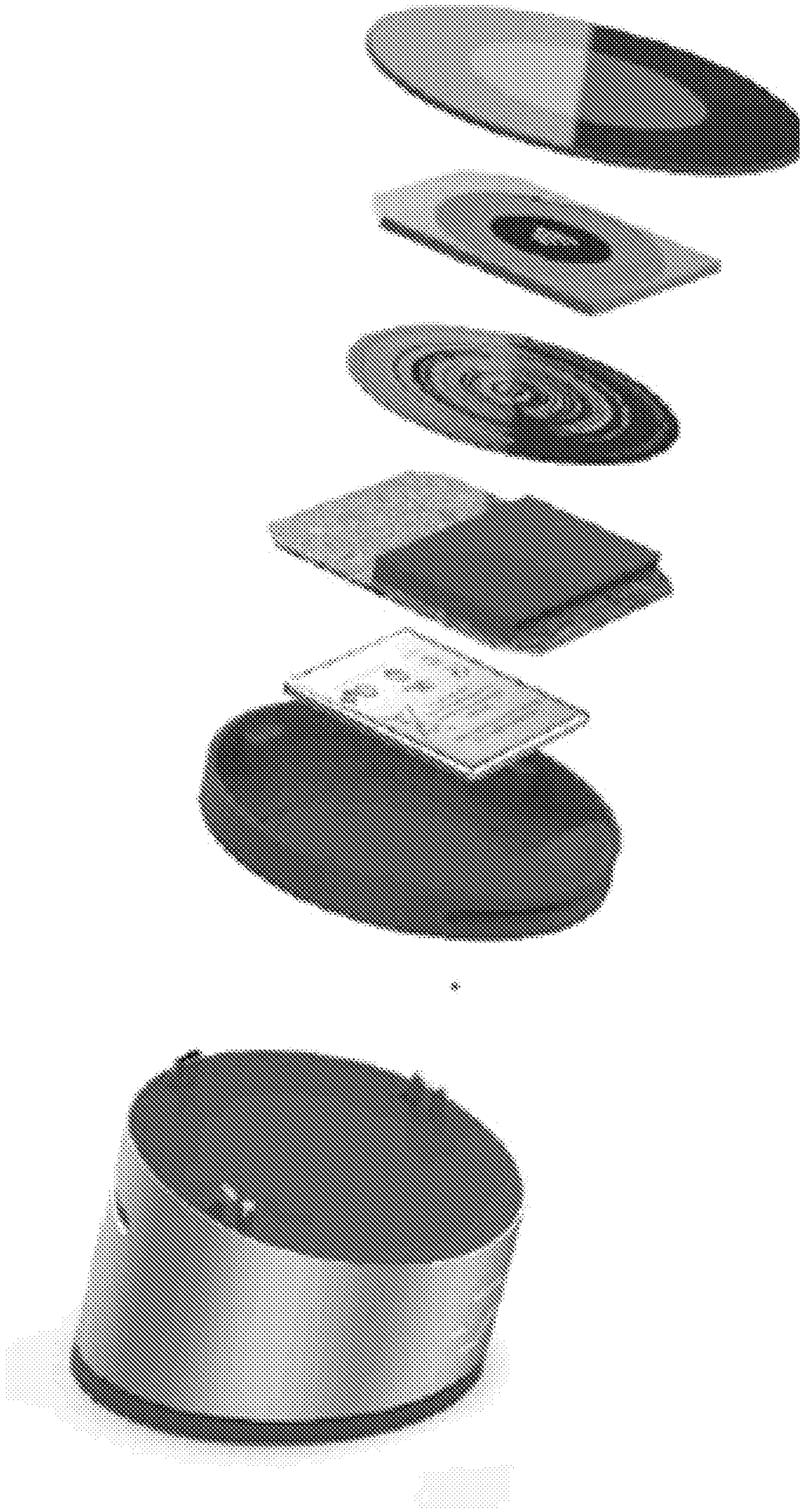
FIG. 19 depicts a break-away view of a card reader and mounting block, according to aspects of the present disclosure.

FIG. 19 depicts a break-away view of a mobile card reader and a mounting block, according to aspects of the present disclosure.

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A register point-of-sale system, comprising:

a register base;

a customer screen that is removeable received by the register base;

a merchant screen mounted on the register base;

a card reader integrated into the customer screen; and a secure memory configured to store a payment application or a key, wherein the customer screen comprises a communication interface configured to communicate wirelessly with the register base when the customer screen is detached from the register base, wherein the payment application is executed by a cloud-based processing machine communicatively coupled to a cylindrical mobile card reader, wherein a cylindrical base further comprises a slot for receiving a physical security device, wherein the merchant screen is mounted such that the merchant screen has an adjustable viewing angle.

2. The register point-of-sale system of claim 1, wherein the merchant screen comprises an image capture device at a lower portion thereof, wherein the image capture device is positioned to scan an active area below the merchant screen.

3. The register point-of-sale system of claim 2, wherein the active area is bounded by the register base.

4. The register point-of-sale system of claim 1, wherein the card reader comprises one or more of a wireless card reader, a magnetic stripe reader, and a slot that receives a chip card.

5. A mobile payment terminal system, comprising:

a mobile payment terminal comprising:

a wireless card reader;

a magnetic stripe reader;

a slot that receives a chip card;

a screen, wherein the screen is customizable;

an integrated receipt printer; and a secure memory configured to store a payment application or a key; and a dock that removably receives the mobile payment terminal, wherein the mobile payment terminal is configured to communicate wirelessly with the dock when in a disconnected mode of operation wherein the payment application is executed by a cloud-based processing machine communicatively coupled to a cylindrical mobile card reader, wherein a cylindrical base of the dock comprises a slot for receiving a physical security device.

6. The mobile payment terminal system of claim 5, wherein the integrated receipt printer comprises a thermal printer.

7. The mobile payment terminal system of claim 5, wherein the dock further comprises a latch that locks the mobile payment terminal to the dock or allows the mobile payment terminal to be removed from the dock.

8. The mobile payment terminal system of claim 5, wherein the dock charges a battery in the mobile payment terminal when the mobile payment terminal is docked on the dock.

9. The mobile payment terminal system of claim 5, wherein the dock further comprises a slot for receiving a securing device.

10. The mobile payment terminal system of claim 5, further comprising:

a bumper that is removably received by the mobile payment terminal and protects the mobile payment terminal from damage.

11. A cylindrical mobile card reader system, comprising:

a cylindrical mobile card reader, comprising:

a screen;

a wireless card reader;

a magnetic stripe reader;

a slot that receives a chip card; and a plurality of base slots that receive a plurality of base latches; and a cylindrical base comprising:

a first end;

a second end;

the plurality of base latches disposed on the first end; and a secure memory configured to store a payment application or a key, wherein the payment application is executed by a cloud-based processing machine communicatively coupled to the cylindrical mobile card reader, wherein the cylindrical base further comprises a slot for receiving a physical security device, wherein the cylindrical mobile card reader is configured to communicate wirelessly with the cylindrical base when in a disconnected mode of operation, wherein the first end is angled relative to the second end.

12. The cylindrical mobile card reader system of claim 11, wherein the screen comprises a touch screen.

13. The cylindrical mobile card reader system of claim 11, wherein the screen is customizable.

14. The cylindrical mobile card reader system of claim 11, wherein the cylindrical mobile card reader is wearable with a lanyard.

15. The cylindrical mobile card reader system of claim 11, wherein the cylindrical mobile card reader is removably received by the cylindrical base.

16. The cylindrical mobile card reader system of claim 15, wherein the cylindrical base charges the cylindrical mobile card reader when the cylindrical mobile card reader is received by the cylindrical base.

* * * * *